(12) United States Patent
Lindsay

(10) Patent No.: US 6,896,006 B2
(45) Date of Patent: May 24, 2005

(54) DESIGN AND MANUFACTURING METHOD FOR MULTI-MATERIAL TUBE STRUCTURES

(75) Inventor: Howard A. Lindsay, Scottsdale, AZ (US)

(73) Assignee: Vyatek Sports, Inc., Scottsdale, AZ (US)

(*) Notice: Subject to any disclaimer, the term of this patent is extended or adjusted under 35 U.S.C. 154(b) by 61 days.

(21) Appl. No.: 10/379,357

(22) Filed: Mar. 4, 2003

(65) Prior Publication Data

US 2003/0196716 A1 Oct. 23, 2003

Related U.S. Application Data

(60) Provisional application No. 60/361,618, filed on Mar. 4, 2002.

(51) Int. Cl.$^7$ .................................................. F16L 9/14
(52) U.S. Cl. ..................... 138/143; 138/172; 138/177; 138/174
(58) Field of Search ........................ 138/174, 177, 138/143, 138, 139, 172; 473/320, 321

(56) References Cited

U.S. PATENT DOCUMENTS

| | | | |
|---|---|---|---|
| 147,446 A | 2/1874 | Stilwell ..................... 138/172 |
| 1,472,518 A | 10/1923 | Gillette et al. ............. 138/171 |
| 1,535,667 A | * 4/1925 | Horne ........................ 473/303 |
| 2,099,126 A | * 11/1937 | Larsen ........................ 156/256 |
| 2,327,347 A | 8/1943 | Gibbin ........................ 433/96 |
| 2,330,651 A | 9/1943 | Welger ....................... 138/133 |
| 2,648,720 A | 8/1953 | Alexander ................... 174/34 |
| 3,047,026 A | 7/1962 | Kahn .......................... 138/122 |
| 3,259,405 A | 7/1966 | Heller ..................... 138/121 X |
| 3,367,370 A | 2/1968 | Sherlock .................... 138/104 |
| 3,379,220 A | 4/1968 | Kiuchi et al. .............. 138/125 |
| 3,825,036 A | * 7/1974 | Stent .......................... 138/174 |
| 3,885,594 A | * 5/1975 | Tanaka ....................... 138/129 |
| 3,945,867 A | 3/1976 | Heller, Jr. et al. ...... 138/123 X |
| 3,972,529 A | * 8/1976 | McNeil ....................... 473/320 |
| 4,027,659 A | * 6/1977 | Slingluff ..................... 600/435 |
| D246,003 S | 10/1977 | Shimada ..................... D21/752 |
| 4,067,362 A | 1/1978 | Jackman ..................... 138/173 |
| 4,082,277 A | 4/1978 | Van Auken et al. ........ 473/320 |

(Continued)

FOREIGN PATENT DOCUMENTS

| | | |
|---|---|---|
| EP | 0290798 A2 | 4/1988 |
| EP | 0 644 365 A1 | 3/1995 |
| EP | 0673752 | 9/1995 |
| WO | WO 95/05555 | 2/1995 |
| WO | WO 01/39847 | 6/2001 |
| WO | 03/076176 A2 | 9/2003 |

Primary Examiner—Patrick Brinson
(74) Attorney, Agent, or Firm—Snell & Wilmer LLP

(57) ABSTRACT

The present invention provides an improved tubular structure which uses the properties of different materials, such as stiffness, strength, and density are exploited in a manner which combines the most attractive characteristics of existing metal and composite tubes into a metal/composite tube which contains performance characteristics (stiffness, strength or weight) not possible with pure metal or composite materials.

For example, an improved tube is suitably created with a conventional metallic tube structure (e.g., steel, aluminum, titanium or the like). The original tube is modified with a secondary operation such as machining, punching, laser cutting or the like to remove various portions of the original tube wall, resulting in a tube with some pattern of "holes" or "cutaway" sections, thus resulting in a lighter tube. The tube is then suitably "fused" with composite material. For example, in one embodiment of the present invention, the metal piece is placed in a mold assembly and composite materials are molded inside the metal tube resulting in a part metal and part composite tube that has beneficial characteristics of each material.

10 Claims, 3 Drawing Sheets

U.S. PATENT DOCUMENTS

| | | | | |
|---|---|---|---|---|
| 4,131,701 A | | 12/1978 | VanAuken | 138/143 |
| 4,267,863 A | * | 5/1981 | Burelle | 138/109 |
| 4,272,971 A | | 6/1981 | Loyd et al. | 138/141 X |
| 4,304,266 A | | 12/1981 | Kutnyak et al. | 138/129 |
| 4,456,034 A | | 6/1984 | Bixby | 138/122 |
| 4,474,233 A | | 10/1984 | Swozil | 165/184 |
| 4,555,113 A | | 11/1985 | Shimazaki et al. | 473/320 |
| 4,564,319 A | * | 1/1986 | van Waveren | 406/193 |
| 4,698,890 A | | 10/1987 | Neaves | 29/412 |
| 4,725,060 A | | 2/1988 | Iwanaga | 473/289 |
| 4,830,059 A | | 5/1989 | Silberstang | 138/130 |
| 5,036,890 A | | 8/1991 | Whaley | 138/109 |
| 5,195,675 A | | 3/1993 | Ouden | 228/174 |
| 5,280,706 A | | 1/1994 | Yorgason | 60/255 |
| 5,305,798 A | | 4/1994 | Driver | 138/98 |
| 5,456,674 A | * | 10/1995 | Bos et al. | 604/526 |
| 5,468,033 A | | 11/1995 | Dohrmann et al. | 293/133 |
| 5,485,948 A | | 1/1996 | McCrink | 228/126 |
| 5,735,752 A | | 4/1998 | Antonious | 473/317 |
| 5,778,938 A | | 7/1998 | Chick et al. | 138/98 |
| 5,803,476 A | | 9/1998 | Olson et al. | 280/281.1 |
| 5,853,651 A | | 12/1998 | Lindsay | 264/512 |
| 5,876,054 A | | 3/1999 | Olson et al. | 280/281.1 |
| 5,904,628 A | | 5/1999 | MacKay, Jr. et al. | 473/326 |
| 5,908,049 A | | 6/1999 | Williams et al. | 138/125 |
| 5,913,337 A | | 6/1999 | Williams et al. | 138/125 |
| 5,961,396 A | | 10/1999 | Morell et al. | 473/320 |
| 5,997,970 A | | 12/1999 | You | 428/36.2 |
| 6,000,435 A | | 12/1999 | Patel et al. | 138/122 |
| 6,024,134 A | | 2/2000 | Akedo et al. | 138/129 |
| D426,277 S | | 6/2000 | McTague | D21/757 |
| 6,244,303 B1 | * | 6/2001 | Adams | 138/129 |
| 6,453,950 B1 | | 9/2002 | Smith | 138/115 |

* cited by examiner

DESIGN AND MANUFACTURING METHOD FOR MULTI-MATERIAL TUBE STRUCTURES

CROSS-REFERENCE TO RELATED APPLICATION

This application claims the benefit of the filing date of U.S. Provisional Patent Application, Ser. No. 60/361,618 entitled "Design and Manufacturing Method for Multi-Material Tube Structures," filed on Mar. 4, 2002, which is incorporated by reference herein.

FIELD OF INVENTION

This invention relates generally to high performance tubular technology exhibiting lighter and stronger properties as well as improved stiffness (longitudinally or torsionally). The characteristics of the invention are particularly useful in tube and tube-like structures, such as golf shafts, lacrosse sticks, bicycles and bike components, ski poles, hockey sticks, softball/baseball bats, automotive and motorcycle frames and similar components.

BACKGROUND OF THE INVENTION

Current tubular technology used in various sporting goods, automotive, aerospace and similar applications can generally be divided into two major technologies: (1) metals such as steel, aluminum or titanium and (2) composites such as graphite/epoxy, fiberglass, and/or other fiber/resin combinations.

Additionally, sub-categories of these technologies exist which can vary by processing, such as casting, forging or extruding metals, or flag wrapping, filament winding or molding composites.

The application the technology will be used in typically dictates the specific materials and processes ultimately used. In addition to desired performance criteria, such as weight, strength or stiffness, other factors also come into the equation such as cost, cosmetic attributes and marketing appeal, as well as manufacturing issues and constraints.

Notably, differing materials have differing inherent strengths and weaknesses and product design engineers generally try to exploit particular properties to overcome weaknesses in the materials.

For example, "Chrome-Moly" steel is an excellent material for many tube related products. It is strong, relatively inexpensive, available in many sizes and variations and has a well-developed reputation with manufacturers and designers. However, it is also a heavy material and is considered "old" technology for many new products/markets.

Thus, technology which better exploits the attractive properties of materials, while diminishes the effects of less desirable properties, and methods for manufacturing the same, are desirable.

SUMMARY OF THE INVENTION

While the way in which the present invention addresses the disadvantages of the prior art will be discussed in greater detail below, in general, the present invention provides tubular technology which offers significant advantages over prior art tubular technology.

For example, in accordance with the present invention, properties of different materials, such as stiffness, strength, and density are exploited in a manner which combines the most attractive characteristics of existing metal and composite tubes into a metal/composite tube which contains performance characteristics (stiffness, strength or weight) not possible with pure metal or composite materials.

For example, in accordance with an exemplary embodiment of the present invention, an improved tube is suitably created with a conventional metallic tube structure (e.g., steel, aluminum, titanium or the like). The original tube is modified with a secondary operation such as machining, punching, laser cutting or the like to remove various portions of the original tube wall, resulting in a tube with some pattern of "holes" or "cutaway" sections, thus resulting in a lighter tube. The tube is then suitably "fused" with composite material. For example, in one embodiment of the present invention, the metal piece is placed in a mold assembly and composite materials are molded inside the metal tube resulting in a part metal and part composite tube that has beneficial characteristics of each material.

BRIEF DESCRIPTION OF THE DRAWINGS

The subject matter of the present invention is particularly pointed out and distinctly claimed in the concluding portion of the specification. A more complete understanding of the present invention, however, may best be obtained by referring to the detailed description and claims in connection with the drawing figures, wherein:

DETAILED DESCRIPTION

Figure 1:
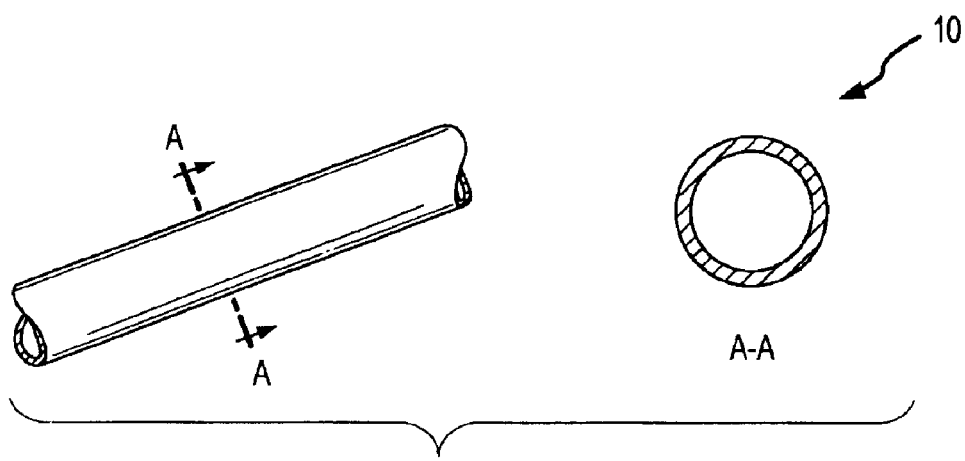
FIG. 1 is a conventional metal tube used in accordance with an exemplary embodiment of the present invention.

The following description is of exemplary embodiment of the invention only, and is not intended to limit the scope, applicability or configuration of the invention in any way. Rather, the following description is intended to provide a convenient illustration for implementing various embodiments of the invention. As will become apparent, various changes may be made in the function and arrangement of the elements described in these embodiments without departing from the scope of the invention as set forth in the appended claims.

For example, in the context of the present invention the method and apparatus hereof find particular use in connection with tubular structures found in sporting goods (golf shafts, etc.) and frames (bicycles and the like). However, generally speaking, numerous applications of the present invention may be realized.

For example, though "tubular" structures are generally referred to herein to mean generally cylindrical structures (e.g., golf shafts, ski poles and the like), it will be appreciated that other non-cylindrical at least partially hollow shapes (e.g., a golf club heads, hockey sticks, lacrosse sticks) which incorporate the present invention may likewise be used. Accordingly, as used herein, "tubular" means any shaped structure, typically comprising walls which at least partially enclose a volume.

Likewise, numerous manners of orienting and manufacturing tubular structures in accordance with the present invention may be used, all of which fall within the scope of the present invention.

That being said, in accordance with the present invention, in general, various materials are combined to obtain the most attractive characteristics of existing (or as yet unknown) metal and composite materials into a new metal/composite tube which contains performance characteristics (stiffness, strength or weight) not possible with pure metal or composite materials.

In this context, the properties of different materials, including stiffness, strength, and density are considered in accordance with the present invention. As used herein, they are referred to using the following common letter designations and have approximate values for a few sample materials listed:

| Material Property: | Letter Designation | Typical Properties For: | | |
|---|---|---|---|---|
| | | 4130 Steel: | 0-75-T6A1 | Graphite/Epoxy |
| Stiffness | E | 30 Msi | 10 Msi | 19 Msi |
| Strength | σ | 190 Ksi | 83 Ksi | 230 Ksi |
| Density | ρ | 0.289 lb/ln$^3$ | 0.10 lb/ln$^3$ | 0.057 lb/ln$^3$ |

As the table shows, different materials have properties that vary greatly. While, materials engineers use several other characteristics to fully define the behavior of specific materials, in the context of the present invention the foregoing criteria are used to illustrate the benefits of the present invention.

Additionally, briefly, associated processes for manufacturing "tubes" from these various materials is not explained herein, however, one skilled in the relevant art will appreciate that various conventional metal and/or composite forming techniques may be used in accordance with the present invention.

Figure 2:
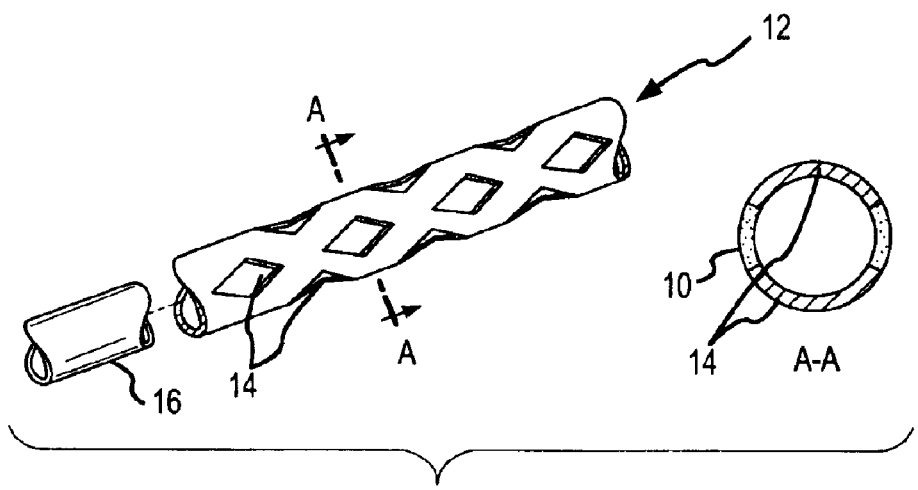
FIG. 2 is an exemplary framing tube in accordance with an embodiment of the present invention.

With reference to FIGS. 1 and 2, illustrates the components and steps involved in manufacturing an improved tube 5 in accordance with the present invention. For example, an improved tube in accordance with one embodiment of the present invention comprises, a conventional tubular structure made of steel, aluminum, titanium or the like having suitably solid, continuous walls is provided 10. Briefly, however, as mentioned above, conventional tubular structure 10 may alternative comprise any number of non-cylindrical shapes. For example, structure 10, may comprise nearly any structure which has at least one wall which at least partially encloses a volume. For example, a golf club head, while not "cylindrical," has a wall in the shape of a typical golf club head, and the wall encloses a volume, thus resulting in a hollow structure having the shape of a golf club head. Likewise, structure 10 may comprise a "tubular" structure having a rectangular, square, triangular, octagonal or other cross section, as well as any combination of the same. Such shapes are commonly found in hockey sticks, lacrosse sticks, tennis racquets and other sporting equipment as well as in framing for various vehicles (bicycles, motorcycles, automobiles, etc.) and structures (houses, building and the like). All fall within the scope of the present invention and may likewise be substituted in the context of the present invention.

Next, tube 10 is modified with a secondary operation such as machining, punching, laser cutting or the like to remove portions of tube 10 wall, resulting in a framing tube 12 with some pattern of holes or apertures 14 (also referred to herein as "cutaway" sections).

Next, composite materials 16 are molded inside tube 12 (e.g., within a mold assembly) resulting in a part metal, part composite tube. Thus, in accordance with the present invention, the orientation and amount of the material remaining in tube 12, the orientation and amount of composite material 16 used, suitably allows various properties of each material to be enhanced in improved tube 5. For example, because composite material 16 is typically lighter, stronger and stiffer than most metals improved tube 5 is also lighter, stiffer, or stronger. In accordance with another beneficial aspect of the present invention, the configuration of improved tube 5 is visible on the surface of tube 5 and may provide for the placement of various indicia (e.g., product name, specifications and the like) on the outer surface of tube 5.

Of course, as will be appreciated, the pattern of apertures 14 may vary depending on the particular properties desired. Likewise the amount of and orientation of composite material 16 that replace the removed sections may vary as well. That said, in the present exemplary embodiment, apertures 14 are substantially diamond shaped and arranged in a substantially symmetrical pattern about metal tube 10. That said, apertures 14 may take any number of shapes, sizes and configurations, and though diamond shapes are described herein, such shapes are exemplary in nature only, and not intended to limit the scope of the present invention.

With more particularity, and with continuing reference to FIGS. 1 and 2, a particular example of an exemplary embodiment of the present invention is described. As mentioned above, metal tube type structure 10 is provided and symmetrical, diamond-shaped apertures 14 are created in the walls of tube 10 by the removal of material from tube 10, which, in turn, lowers tube's 10 weight and produces a framing tube 12 with a cosmetically pleasing exterior "look."

Next, a conventional composite material 16 (e.g., plastic, graphite or the like), having a generally tubular shape (or otherwise similar shape as framing tube 12) is placed within framing tube 12. Composite 16 is then pressurized or otherwise caused to expand (e.g., through placement in an autoclave) and is thus bonded to framing tube 12, creating one integrated component—improved tube 5.

Figure 3:
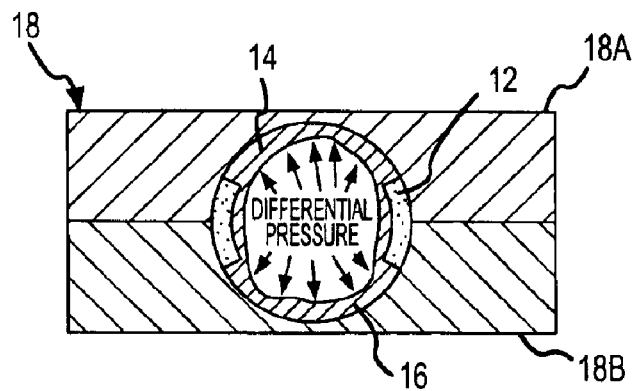
FIG. 3 is a cross-sectional view of a framing tube and composite material in a mold in accordance with an exemplary embodiment of the present invention.

Of course, various steps for fabricating improved tube 5, now known or as yet unknown, may also be used. For example, with reference now to FIG. 3, framing tube 12 and composite material 16 combination may be placed into a female mold 18 and the above steps repeated. Generally, mold 18 comprises any suitably rigid device having an inner diameter configured in the general shape of improved tube 5. Such molds are commonly known and often comprises two halves 18A, B such as those illustrated in FIG. 3. As such, molds 18 assist in creating a desired finish on the outer surface of improved tube 5. Other improvements to the fabrication may also be realized.

For example, in an exemplary embodiment, the molding process may comprise placing layers of composite material 16 over an inflatable bladder (not shown, but commonly made of nylon, latex, silicone or the like), placing the bladder and composite combination 16 within framing tube 12 and pressurizing the bladder to consolidate (i.e., squeeze) composite material 16 against the inner surface of framing tube 12. As is generally known, this inflation method may use various pressurization techniques including a process called "trapped rubber molding" where the composite layers are wrapped around a rubber (usually silicone) mandrel, placed in a high temperature oven, and heated.

In any event, it should thus be appreciated that any number of "molding" operation such as those now known or as yet unknown may be used in the context of the present invention.

In instances such as those described above, a coefficient of thermal expansion (CTE) for the bladder and composite material 16 (or mold 18) is much higher than framing tube 12 and a differential pressure is created consolidating composite material 16 and framing tube 12 into a substantially finished product; improved tube 5.

In accordance with this embodiment of the present invention, the internal pressure forces composite material 16 against the inner surface of framing tube 12, bonding the two materials together and forcing a portion of composite material through apertures 14 and pushing the layers directly against the surface of mold 18. Improved tube 5 is then removed from the mold assembly and composite material 16 is visible through apertures 14. Thus, in this embodiment, improved tube 5 has a substantially consistent outside diameter.

Figure 4:
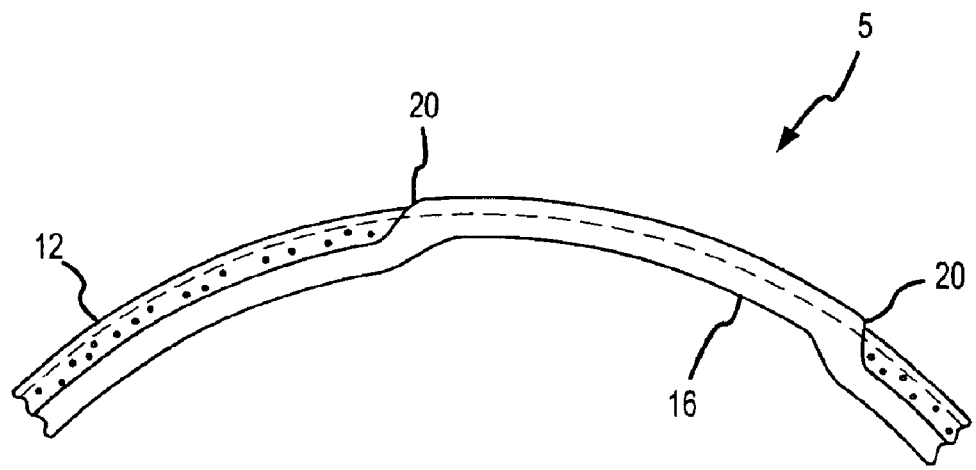
FIG. 4 is a close-up cross-sectional view of the surface and transition points between framing tube and composite material in accordance with an exemplary embodiment of the present invention.

Additionally, with reference now to FIG. 4, in accordance still further aspects of the present invention, improved tube 5 may be suitably machined, ground or otherwise processed to clean up any minor transition discontinuities (a portion 20 where composite material 16 meets framing tube 12) between the two materials.

Figure 5:
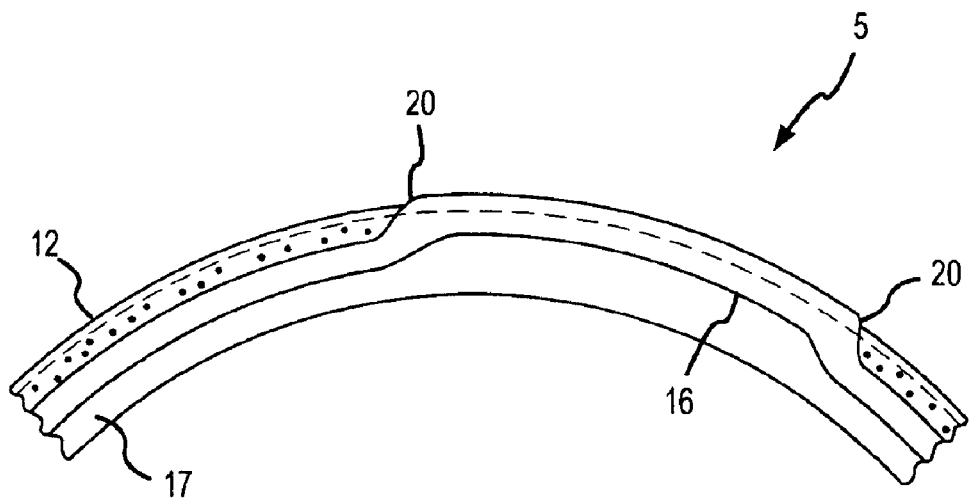
FIG. 5 is a close-up cross-sectional view of a framing tube and composite combination with an inner composite sleeve in accordance with an exemplary embodiment of the present invention.

In accordance with yet a further aspect of the present invention, and with reference to FIG. 5, improved tube 5 may further comprise an inner composite sleeve 17 which is suitably integrated with framing tube 10 and composite material 16. For example, inner sleeve 17 may comprise a section of composite material similar to composite material 16 which is placed within framing tube 10 and composite material 16. Generally, inner sleeve 17 will have a thickness similar to the thickness of framing tube 10 and/or composite material 16 and comprise the same material as composite material 16.

However, those skilled in the art will appreciate that inner sleeve 17 may alternatively comprise other materials than composite material 16 and may have different dimensions than framing tube 10 and/or composite material 16.

Still referring to inner sleeve 17, fabrication of improved tube 5 typically remains similar to improved tubes 5 lacking inner sleeve 17. For example, inner sleeve 17 may be integrated during the "pressurization" step of bonding composite material 16 and framing tube 10. Alternatively, inner sleeve 17 may be integrated in separate pressurization step after composite material 16 and framing tube 10 have been fabricated. Likewise, depending on the particular application an elastomeric bladder may or may not be used in the foregoing steps.

Figure 6:
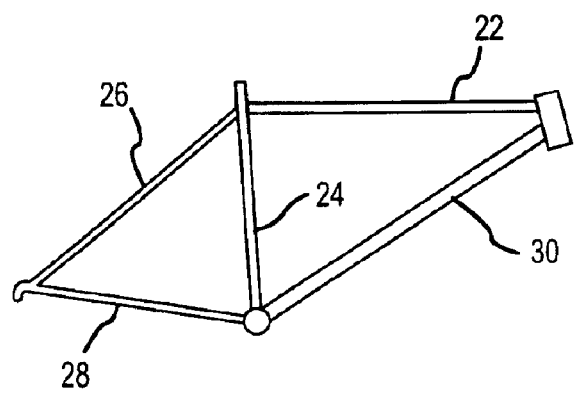
FIG. 6 is a bike frame used in describing an exemplary embodiment of the present invention.

FIG. 6 illustrates an exemplary embodiment of the present invention in use in a bicycle frame. For example, the frame that makes up the base structure of a bicycle is made up of various tubular structures and typically resembles that shown in FIG. 3, having a top tube 22, a seat tube 24, a seat stay tube 26, a chain stay tube 28 and a down tube 30. As is generally known, an ideal bicycle frame is light, vertically compliant (for rider comfort) and torsionally rigid (for maximum energy conversion). Preferably, each tube is individually designed to perform a particular role (support, rigidity, impact absorption, etc.) in the frame assembly. The behavior of each of these tubes (or any tube) can be fully characterized by their weight, longitudinal bend/stiffness profile (an "EI" curve) and torsional twist/stiffness profile (a "GJ" curve).

Because of the unique properties of the various engineering materials available (such as those mentioned above), improved tubes 5 in accordance with the present invention can be designed and built that add new performance attributes to each tube. For example, in one embodiment, by removing approximately 0.5 lbs of titanium material from the down tube 3 of a bicycle frame and replacing it with a "comparable" volume of carbon/epoxy material oriented to optimize the torsional rigidity, the weight of down tube 30 can be lowered about 0.32 lbs.

For example, titanium has a density of about 0.16 lbs/in$^3$ and a typical carbon/epoxy's density is about 0.057 lbs/in$^3$. As is well known weight (W) equals the volume (V) multiplied by the density ($\rho$); thus, 0.5 lb of titanium equates to a volume of 3.125 ln$^3$.

$W_T = V_C \rho_T$, or $V_T = W_T/\rho_T = 0.5$ lbs/0.16 lbs. $= 3.125$ in$^3$

Then if we replace that same volume (3.125 in$^3$) of titanium with carbon epoxy the new weight is:

$W_C = V_C \rho_C = (3.125$ in$^3)(0.057$ lbs/in$^3) = 0.178$ lbs.

A reduction of 0.5 lbs$-0.178$ lbs$=0.32$ lbs (or in this instance about 64%), which is desirable in bicycle applications is possible.

Because carbon/epoxy material is also stiffer than the titanium ($E_C=19$ Msi v. $E_T=16$ Msi) improved tube 5 is also stiffer, particularly torsionally, due to the orientation of fibers in material 16 of improved tube 5.

Similar approaches may be used for any beam defined by stiffness (long tubular or torsional) and weight criteria. In accordance with the present invention, improved tube 5 exploits the fact that composite materials (such as carbon/epoxy) have higher stiffness per weight than metals and can therefore be designed to enhance metal designs.

Figure 7:
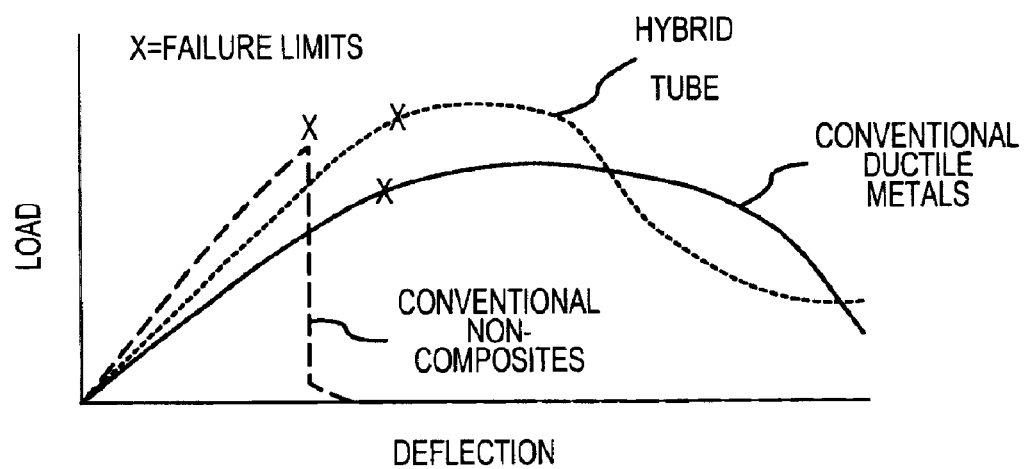
FIG. 7 is a graph illustrating deflection versus load curve illustrating properties of an exemplary embodiment of the present invention with other conventional materials.

In accordance with additional aspects of the present invention, improved tube 5 also suitably retains many of the positive attributes of metal tubes, such as the ability to be welded into assemblies, or fitted with internal/external threads for attaching fittings and couplers, while obtaining the ability to exploit benefits of composites such as their infinite design flexibility. With hundreds of fibers and resins, the "composite" part of improved tube 5 can be tailored or engineered for many unique benefits. For example, as can be seen in FIG. 7, the composite element of the tube can be made of tough, high strain materials such as Kevlar™ to produce lightweight tubes with safe, non-catastrophic failure modes. Stated otherwise, improved tube 5 can withstand higher loads with less deflection.

In summary, the ability to independently vary the longitudinal torsional and mass distribution properties allow improved tubes 5 to achieve performance attributes not possible with conventional metal or composite tubes such as:

Lighter golf shafts with conventional stiffness/torque values.

Stronger strut assemblies with metal ends and composite middles.

Softball bats with higher circumferential stiffness (less deflection) to help improve energy conversion during impact.

Bike frames that are lighter yet stiffer.

Of course, it should be appreciated that although the examples listed have emphasized "tubes," the present invention is equally applicable to other "shapes" as well, which use of a dimensionally similar metal piece, machined with various openings or cutaways which reduce weight and reveal the inner diameter, and then combine it with some molded composites materials/process to yield a structure in accordance with the present invention. For examples, non-tube related products include:

Golf club heads such as hollow wood heads

Monocoque bike frame assemblies

Aircraft fuselages

The flexible "molding" nature of composite materials help make this invention possible. The adhesive systems of modern composite material systems allow one to "co-cure" composite materials 16 while simultaneously bonding them to framing tube 12.

Finally, in the foregoing specification, the invention has been described with reference to specific embodiments. However, one of ordinary skill in the art appreciates that various modifications and changes can be made without departing from the scope of the present invention as set forth in the claims below. Accordingly, the specification is to be regarded in an illustrative rather than a restrictive sense, and all such modifications are intended to be included within the scope of the present invention.

Likewise, benefits, other advantages, and solutions to the problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

I claim:

1. A tubular structure, comprising a substantially cylindrical metal tube, having a wall with a series of apertures, a composite material placed therewithin, wherein said composite material is contiguous with an inner surface of said wall of said metal tube and an inner sleeve within said composite material.

2. A tubular structure according to claim 1, wherein each of said apertures have substantially the same shape.

3. A tubular structure according to claim 1, wherein said apertures are substantially symmetrical to one another.

4. A tubular structure according to claim 1, wherein said composite material extends through said apertures.

5. A tubular structure according to claim 1, wherein said metal tube has an outer surface defining an outer plane and wherein said composite material extends through said apertures a distance such that an outer surface of said portion of said composite material extending through said aperture is contiguous with said outer plane.

6. A tubular structure according to claim 1, wherein said apertures have a diamond shape.

7. A composite structure, comprising an outer structure with at least one outer wall that at least partially enclose a volume, said outer structure having a series of apertures, and a composite material placed on an inner side of said outer structure, wherein said composite material is contiguous with said inner surface, and an inner sleeve within said composite material, and wherein said outer structure has an outer surface defining an outer plane and wherein said composite material extends through said apertures a distance such that an outer surface of said portion of said composite material extending through said aperture is contiguous with said outer plane.

8. A composite structure according to claim 7, wherein each of said apertures have substantially the same shape.

9. A composite structure according to claim 7, wherein said apertures are substantially symmetrical to one another.

10. A composite structure according to claim 7, wherein said composite material extends through said apertures.

* * * * *